Oct. 22, 1946. E. T. BARRON 2,409,729
DIFFERENTIAL LOCKING MEANS
Filed Aug. 19, 1944 2 Sheets-Sheet 2

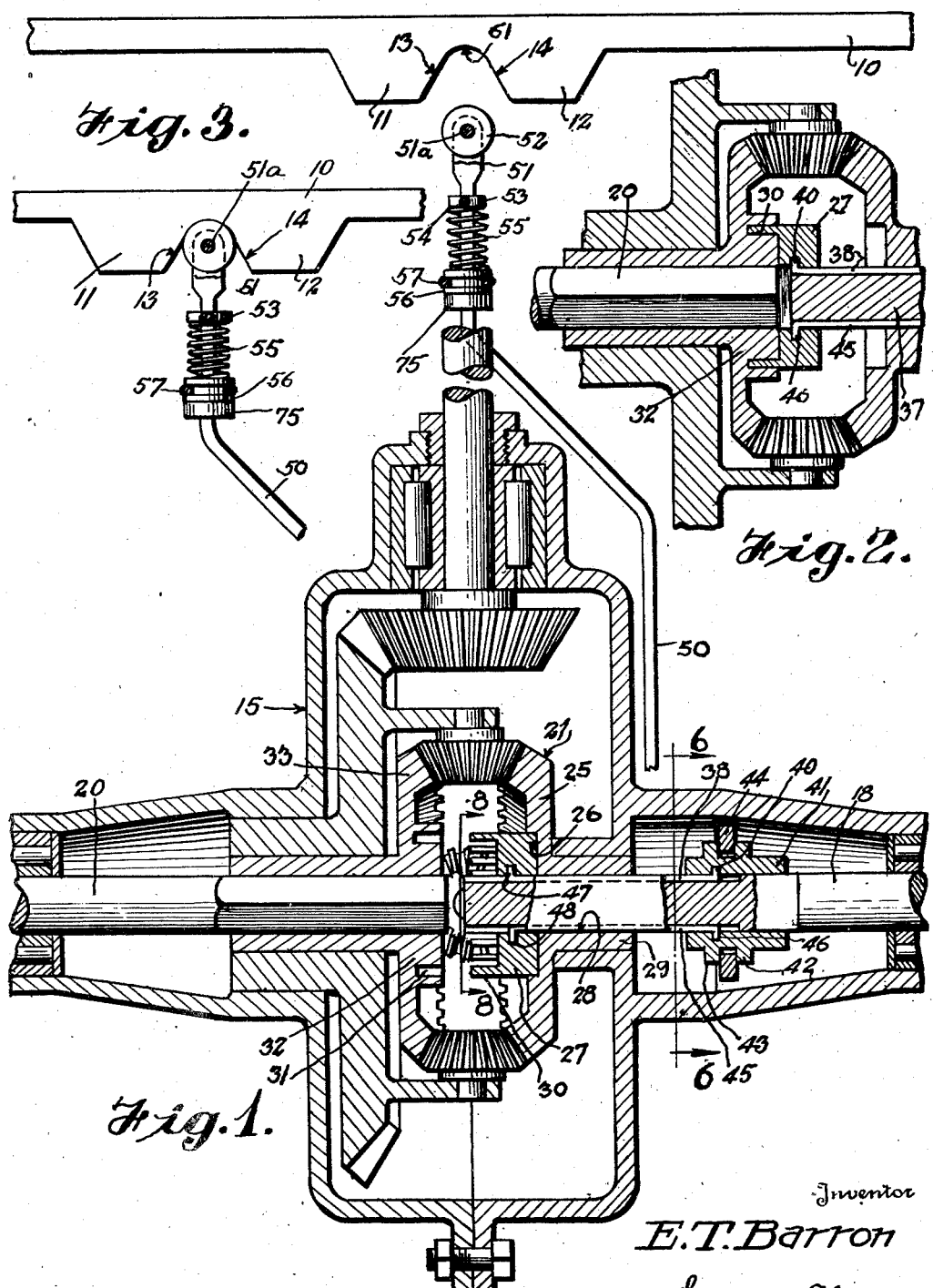

E. T. Barron, Inventor
By Munn, Liddy & Glaccum
Attorneys

Patented Oct. 22, 1946

2,409,729

UNITED STATES PATENT OFFICE 2,409,729

DIFFERENTIAL LOCKING MEANS

Edward T. Barron, Minneapolis, Minn.

Application August 19, 1944, Serial No. 550,285

6 Claims. (Cl. 74—316)

This invention relates to a device for connecting together the rear axles of an automobile.

An object of the invention is the provision of a device for connecting the rear axles of an automobile together when it is desired to drive both rear axles and likewise the rear wheels simultaneously in order to cause the vehicle to be forced from a spot where the wheels have been mired, and where it is impossible to move the vehicle from said spot, because of the fact that one rear wheel may remain stationary while the other one revolves under the influence of the differential.

Another object of the invention is the provision of a device connecting the rear axles of a vehicle together for causing simultaneous rotation of both rear wheels in order to force the vehicle from a bad spot along the path of travel, while permitting the usual differential to function when the vehicle is turned to the right or left.

A further object of the invention is the provision of an arrangement forming an attachment for a vehicle, said attachment including a roller adapted to be received between a pair of cam surfaces formed on spaced projections on the usual connecting rod between the front wheel spindles of an automobile, said roller being carried by one end of a spring pressed rod which will operate clutch elements and cause the same to be moved into operative relation for connecting the rear axles together when the roller is located between the cam surfaces, so that the rear wheels may be driven simultaneously for forcing the vehicle away from a bad spot in the path of the travel of said vehicle, said cam surfaces acting on the roller when the connecting rod is shifted for forcing the roller away from the connecting rod and releasing the clutch elements so that the vehicle may be turned to the right or left, and so that the usual differential may be brought into play.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

Fig. 1 is a horizontal section of a rear axle housing showing the differential and clutch elements for connecting the rear axles together with the mechanism for moving the clutch elements into operative relationship.

Fig. 2 is a fragmentary vertical section showing the clutch elements connecting the rear axles together in operative relationship.

Fig. 3 is a fragmentary view showing a roller and operating rod for the clutch members in position between a pair of cam surfaces formed on spaced lugs projecting laterally from the usual front wheel spindle connecting rod.

Figure 4:
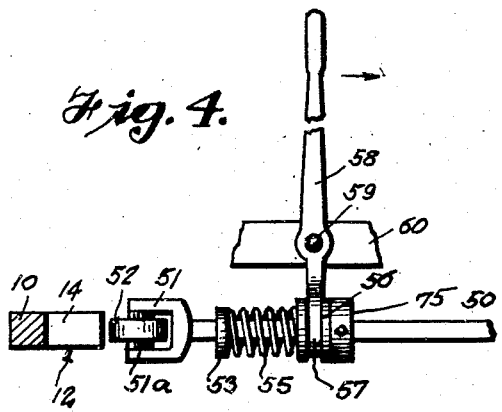
Fig. 4 is a fragmentary side view, partly in section, of the device shown in Fig. 3.

Referring more particularly to the drawings, 10 designates a connecting rod which is normally used in automobiles for connecting the spindles of the front wheels together so that said wheels will be simultaneously turned in the same direction when the automobile is being turned to the right or left. The usual connecting rod, however, is modified in that it has a pair of spaced lugs 11 and 12 projecting laterally and rearwardly from the connecting rod with the space between the lugs forming a V-shaped notch, so that the lug 11 will have a cam surface 13, while lug 12 will have a cam surface 14, for a purpose which will be presently explained.

The rear axle housing 15 of the vehicle will be slightly altered in that it has a slot 16 in a section 17 of the housing which confines the rear axle 18. This housing is also provided with a pivot pin 19 mounted exteriorly thereon adjacent the slot 16 for a purpose which will be presently explained. The rear axle housing contains the usual rear axle 20 in addition to the rear axle 18 previously mentioned with a differential generally designated by the numeral 21 for controlling a simultaneous rotation of the axles 18 and 20 or for variable rotation of said axles in the usual manner. A gear 25 of the differential 21 when revolved rotates axle 18. This gear, however, is provided with a pocket 26 to receive the outer end of a clutch member 27. The inner end of the axle 18 is square shaped in cross section and is received by a passage 28 which is likewise a square shaped passage formed in a sleeve 29 which is integrally connected with the gear 25. The opening in the clutch member 27 through which the inner end of the axle 18 passes is square shaped so that when the gear 25 rotates the axle 18 and the clutch member 27 will likewise be revolved. This clutch member is provided with a plurality of teeth 30 arranged in the circumference of a circle and they are adapted to be moved into pockets 31 formed in a clutch element 32 which is formed integrally with a gear 33 forming part of the differential 21. This gear drives the rear axle 20 during the normal operation of the vehicle.

The axle 18 is provided with a pair of grooves 35 and 36 located at diametrically opposite lines on the square shaped portion 37 of the axle 18. In the groove 35 is mounted a link 38 which has its outer surface flush with the outer adjacent surface of the square shaped portion 37 of the axle 18. One end of the link is provided with a lug 40 which is received within a notch of a collar 41 slidably mounted on the square shaped portion 37 of the axle. This collar is provided with a pair of spaced parallel ribs 42 and 43 and a ring 44 is received between the ribs so that when the ring is shifted the collar 41 will likewise be shifted.

A second link 45 is received within the groove 36 and has a lug 46 received within a pocket in the inner wall of the collar 41. The links 38 and 45 are provided with respective lugs 47 and 48 received in diametrically opposite pockets located within the clutch element 27. Thus, it will be seen that when the collar 41 is shifted the clutch element 27 will likewise be shifted so that the teeth 30 of the element 27 will be moved into operative engagement with the pockets 31 in the clutch element 32 for connecting the shafts 18 and 20 together as shown more particularly in Fig. 2.

A rod 50 is provided with a yoke 51 at its front end carrying a pin 51a upon which is mounted a roller 52 adapted to be moved into the notch between the lugs 11 and 12. A collar 53 is pinned at 54 to the rod 50 against which bears a coil spring 55. The other end of said spring engages a grooved collar 56 which receives a fork 57 at one end of an operating lever 58. This lever as shown in Fig. 4 is pivotally connected at 59 on a stationary bar 60 of the frame of the vehicle. It will be obvious from this construction that when the upper end of the lever 58 is moved in the direction indicated by the arrow that the collar 56 will cause the spring 55 to force the collar 53 forwardly and likewise the roller 52 into the notch 61 formed in the connecting rod 10.

Figure 5:
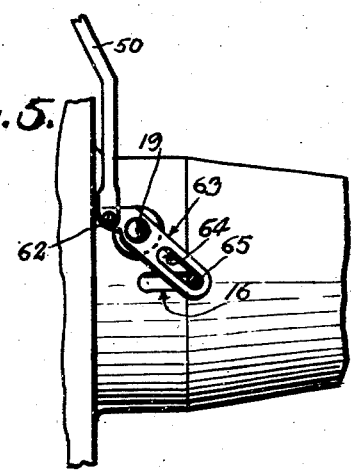
Fig. 5 is a fragmentary side view of the rear axle housing showing the connection between the movable clutch elements and the operating rod which extends to the front wheel spindle connecting rod.
Figure 6:
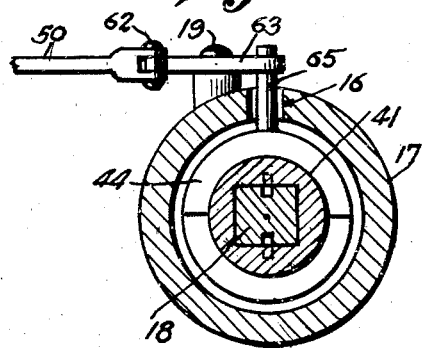
Fig. 6 is a transverse vertical section taken along the line 6—6 of Fig. 1.
Figure 8:
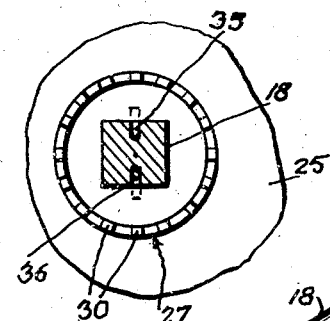
Fig. 8 is a transverse vertical section taken along the line of 8—8 of Fig. 1.
Figure 7:
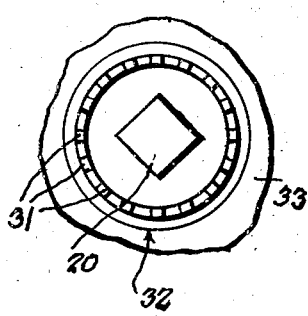
Fig. 7 is a fragmentary vertical section through the transmission showing a fixed clutch element on one axle.
Figure 9:
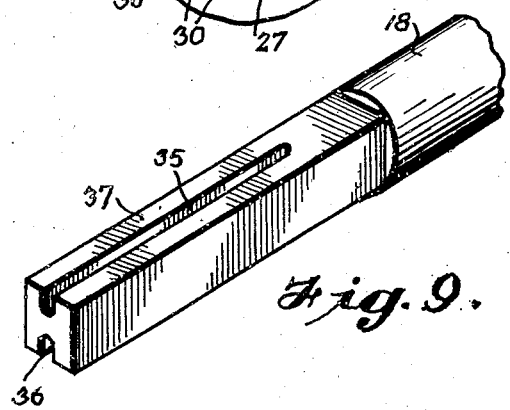
Fig. 9 is a transverse view in perspective of the inner end of the rear axle shown in Fig. 8.

Referring more particularly to Figs. 1 and 5 it will be seen that the rod 50 is bent around the front portion of the rear differential housing 15 and the rear end of this rod is pivotally connected at 62 with a bell crank lever 63 which in turn is pivoted on the pin 19. One arm of the lever 63 is provided with a slot 64 which receives a rod 65 extending through the slot 16 and integrally connected to the ring 44. Due to the position of the slot 64 the side walls of the slot will act as cams causing the rod 65 to be shifted towards or away from the differential and causing a similar movement of the sleeve 41 and likewise the clutch element 27.

The operation of my device is as follows:

During ordinary driving along a roadway the lever 58 is in the vertical position shown in Fig. 4, so that the roller 52 will be outside of the sphere of the notch 61 in the connecting rod 10 and the clutch member 27 is located in the inoperative position shown in Fig. 1.

If the operator has driven the car over soft ground and one rear wheel will spin while the other remains stationary when he attempts to drive out of the soft ground it is only necessary for him to pull the lever 58 in the direction indicated by the arrow in Fig. 4 so that pressure on the spring 55 will move the rod 50 and likewise the roller 52 forwardly so that said roller will be received within the notch 61 and between the cam surfaces 13 and 14 on the connecting rod 10. As the rod 50 is pulled forwardly the bell crank 63 will be rocked and the rod 65 will be moved inwardly towards the housing 15. The ring or yoke 44 is carried inwardly together with the sleeve 41, hence the links 38 and 45 will move the clutch element 27 toward the clutch element 32, hence the teeth 30 of the clutch element 27 will be received within the pockets 31 of the clutch element 32 and the rear axle 20 will be locked or connected to the rear axle 37 so that both rear wheels of the vehicle will be driven simultaneously.

Since the axles have been connected for simultaneous rotation, both wheels will be revolved at the same speed and the automobile will then be driven from the soft spot in the ground.

However, if the operator should fail to move the lever 58 to the vertical position to release the roller 52 from the notch 61 any shifting of the connecting rod 10 when the wheels are steered to the right or the left will cause either cam surface 13 or 14 to act on the roller 52 and force the same rearwardly together with the rod 50, hence the clutch element 27 will be moved away from its operative engagement with the clutch element 32 so that the differential 21 may operate in the usual manner.

A third collar 75 is secured to the rod 50 adjacent the movable collar 56 so that when the grooved collar is moved rearwardly it will engage the fixed collar 75 and force the rod 50 rearwardly for rocking the bell crank 63 to cause the movable clutch element 27 to be released from the fixed clutch element 32 so that the axles may be normally driven by the differential.

I claim:

1. In an automobile, a device for connecting the rear axles together for simultaneous rotation, comprising a front wheel spindle connecting rod having a notch provided with cam surfaces intermediate the ends of said rod, a shiftable rod having a roller positioned adjacent the notch and adapted to be moved into the notch when said rod is shifted toward the connecting rod, a clutch element fixed to one rear axle, a second clutch element rotatable with the other axle and slidable thereon, means moving the slidable clutch elements into operative engagement with the first clutch element for connecting the axles together, means operatively connecting the moving means with the shiftable rod, and manual means for forcing the shiftable rod towards the connecting rod and the roller into the notch so that the moving means will bring the clutch elements together, reciprocation of the connecting rod when the automobile is steered to the right or left causing the roller to ride on a cam surface and force the shiftable rod and roller sufficiently away from the connecting rod to cause disengagement of the clutch elements.

2. In an automobile, having a pair of rear axles, a device for connecting the rear axles together for simultaneous rotation comprising a front wheel spindle connecting rod having an intermediately disposed lateral projection provided with spaced cam surfaces, a roller adapted to be projected between the cam surfaces so the reciprocation of the rod will cause the roller to ride on a surface and move said roller away from the rod, a clutch element fixed on one rear axle, a second clutch element rotated by and slidable on the other axle, means for moving the second clutch element into engagement with the first element for joining the axles together, a shiftable rod carrying the roller at one end and having connections at its other end with the moving means, and manual means for moving the shiftable rod towards the connecting rod for placing the roller between the cam surfaces, reciprocation of the connecting rod causing the cam and the shiftable rod to move away from the connecting rod thereby causing the second clutch element to be released from the first clutch element.

3. In an automobile having a two part rear axle housing, a pair of rear axles journaled in said housings and operated by a differential, a device for connecting said axles together for simultaneous rotation comprising a pair of clutch elements, a bell crank pivoted on one of said axle housings, a sleeve slidable on one axle, a link connecting the sleeve with one clutch element, means operatively connecting the sleeve with the bell crank so that when the bell crank is rocked the said clutch element will be moved into or out of engagement with the other clutch element, an operating rod having one end pivoted on the bell crank, a roller on the other end of said operating rod, a front wheel spindle connecting rod having a notch to receive the roller, the side walls of said notch forming cam faces so that when the connecting rod is shifted the cam faces will engage the roller and force said roller and operating rod rearwardly to rock the bell crank and cause the first-mentioned clutch element to be moved out of engagement with the other clutch element and manual means for moving the operating rod forwardly for placing the roller within the notch.

4. In an automobile having a frame, power driven rear axles and a differential between said axles, a device for positively connecting the axles together for simultaneous rotation comprising a clutch element fixed to one axle, a second clutch element adapted to be moved into engagement with the first clutch and slidably mounted on the second axle for rotation therewith, means for moving the second clutch element into engagement with the first clutch element and including an operating rod extending from the front of the vehicle to the rear thereof, a lever having operative connections with the second clutch element and also connected to the rear end of the rod, a lever pivoted on a fixed part of the automobile frame and having connections with the forward end of the rod for oscillating the rod to rock the first lever and move the second clutch element into or out of engagement with the first clutch element, a front wheel spindle connecting rod movable transversely with the directional turning of the wheels and cooperating means on the connecting rod and the forward end of the operating rod for causing rearward movement of said operating rod to release the second clutch element from the first clutch when the automobile is turned to the right or left.

5. In an automobile having power driven rear axles and a differential between said axles, a device for positively connecting the axles together for simultaneous rotation, comprising a clutch element fixed to one axle, a second clutch element adapted to be moved into engagement with the first clutch and slidably mounted on the second axle for rotation therewith, means for moving the second clutch element into the first clutch element and including an operating rod extending from the front of the vehicle to the rear thereof, a lever having operative connections with the second clutch element connected to the rear end of the rod, a front wheel spindle connecting rod, the free forward end of the operating rod being adjacent the connecting rod, manual means for moving the operating rod forwardly to cause the second clutch member to engage the first clutch member and cam means on said spindle connecting rod engageable with the forward end of operating rod for causing said rod to be moved rearwardly and release the second clutch member when the automobile is turned to the right or left.

6. An automobile drive comprising pairs of front and rear wheels, the former connected for simultaneous turning in steering and the latter differentially connected for driving them, a two part clutch for connecting the rear wheels for simultaneous rotation one part of which is movable, a member movable transversely of the vehicle when the front wheels are turned to the right or left having right and left hand spaced cam surfaces, an actuator for the movable clutch member which is projected into alinement with said cam surfaces when it moves the clutch members into operative engagement and is retracted to disengage said members by the action of one or the other of said cams.

EDWARD T. BARRON.